US012476923B2

(12) United States Patent
Narahari et al.

(10) Patent No.: US 12,476,923 B2
(45) Date of Patent: Nov. 18, 2025

(54) PROVIDING ESTIMATED BANDWIDTH RANGES TO NETWORK-ATTACHED ENTITIES

(71) Applicant: AT&T Intellectual Property I, L.P., Atlanta, GA (US)

(72) Inventors: Sridhar Narahari, Milpitas, CA (US); Barry Elia, King George, VA (US); Jae-Sun Chin, Garland, TX (US); Gregory Harp, Allen, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 18/055,833

(22) Filed: Nov. 15, 2022

(65) Prior Publication Data

US 2024/0163225 A1    May 16, 2024

(51) Int. Cl.
*H04L 47/783* (2022.01)
*H04L 45/76* (2022.01)

(52) U.S. Cl.
CPC ............ *H04L 47/783* (2013.01); *H04L 45/76* (2022.05)

(58) Field of Classification Search
CPC ......... H04L 67/12; H04L 41/40; H04L 67/10; H04L 41/0895; H04L 5/0048; H04L 5/0007; H04L 5/0053; H04L 41/12; H04L 5/0023; H04L 41/0816; H04L 27/2607; H04L 69/22; H04L 25/02; H04L 27/0002; H04L 27/12; H04L 27/26025; H04L 27/2634; H04L 43/08; H04L 41/0806; H04L 41/0893; H04L 41/0894; H04L 41/149; H04L 43/0817; H04L 41/145; H04L 41/16; H04L 43/20; H04L 5/0094; H04L 67/51; H04L 67/52; H04L 67/60; H04L 12/2867; H04L 41/0896; H04L 67/1012; H04L 43/16; H04L 67/101; H04L 47/12; H04L 41/0668; H04L 47/125; H04L 12/40065; H04L 47/822; H04L 65/65; H04L 69/24

See application file for complete search history.

(56) References Cited

U.S. PATENT DOCUMENTS 5,909,443 A * 6/1999 Fichou ............... H04Q 11/0478
370/414
7,672,856 B1 * 3/2010 Cahn ...................... G06Q 50/60
455/445

(Continued)

*Primary Examiner* — Djenane M Bayard

(57) ABSTRACT

In one example, the present disclosure describes a device, computer-readable medium, and method for providing estimated bandwidth ranges to network-attached entities such as applications, user endpoint devices, and customer premises equipment. For instance, in one example, a method performed by a processing system including at least one processor includes collecting performance data for a communications network from a plurality of sensors distributed throughout the communications network, calculating based on the performance data, an estimated lower limit of an available bandwidth in the communications network and an estimated upper limit of the available bandwidth in the communications network, receiving a query from a network attached entity for the available bandwidth in the communications network, and providing, in response to the query, the estimated lower limit and the estimated upper limit to the network attached entity.

20 Claims, 4 Drawing Sheets

(56) References Cited

U.S. PATENT DOCUMENTS

| | | |
|---|---|---|
| 10,931,553 B1 | 2/2021 | Batiz |
| 2005/0021530 A1* | 1/2005 | Garg ..................... G06F 9/505 |
| 2013/0021928 A1* | 1/2013 | Weill ................... H04W 24/08 |
| | | 370/252 |
| 2014/0068013 A1* | 3/2014 | Chen ..................... H04L 65/60 |
| | | 709/219 |
| 2017/0054776 A1* | 2/2017 | Dao ..................... H04L 65/752 |
| 2017/0147056 A1* | 5/2017 | Woo ...................... G06F 1/324 |
| 2018/0349964 A1* | 12/2018 | Schellenberger .. G06Q 30/0277 |
| 2020/0236038 A1* | 7/2020 | Liu ........................ H04L 47/76 |
| 2021/0219179 A1* | 7/2021 | Narath ................. H04W 76/10 |
| 2021/0399971 A1* | 12/2021 | Shiang ............... H04N 21/2383 |
| 2022/0038386 A1* | 2/2022 | Martynov ........... H04L 43/0894 |
| 2022/0132206 A1* | 4/2022 | Killick ............. H04N 21/44209 |

* cited by examiner

PROVIDING ESTIMATED BANDWIDTH RANGES TO NETWORK-ATTACHED ENTITIES

The present disclosure relates generally to network performance, and relates more particularly to devices, non-transitory computer-readable media, and methods for providing estimated bandwidth ranges to network-attached entities such as applications, user endpoint devices, and customer premises equipment.

BACKGROUND

Bandwidth is the maximum rate of data transfer across a given path in a network. Many modern network-connected applications, including video conferencing applications, extended reality (e.g., virtual reality, augmented reality, mixed reality, and the like) applications, immersive gaming applications, and the like, are bandwidth intensive. That is, these applications (and others like them) consume large amounts of the available bandwidth in a network.

SUMMARY

In one example, the present disclosure describes a device, computer-readable medium, and method for providing estimated bandwidth ranges to network-attached entities such as applications, user endpoint devices, and customer premises equipment. For instance, in one example, a method performed by a processing system including at least one processor includes collecting performance data for a communications network from a plurality of sensors distributed throughout the communications network, calculating based on the performance data, an estimated lower limit of an available bandwidth in the communications network and an estimated upper limit of the available bandwidth in the communications network, receiving a query from a network attached entity for the available bandwidth in the communications network, and providing, in response to the query, the estimated lower limit and the estimated upper limit to the network attached entity.

In another example, a non-transitory computer-readable medium stores instructions which, when executed by a processing system including at least one processor, cause the processing system to perform operations. The operations include collecting performance data for a communications network from a plurality of sensors distributed throughout the communications network, calculating based on the performance data, an estimated lower limit of an available bandwidth in the communications network and an estimated upper limit of the available bandwidth in the communications network, receiving a query from a network attached entity for the available bandwidth in the communications network, and providing, in response to the query, the estimated lower limit and the estimated upper limit to the network attached entity.

In another example, a system includes a processing system including at least one processor and a non-transitory computer-readable medium storing instructions which, when executed by the processing system, cause the processing system to perform operations. The operations include collecting performance data for a communications network from a plurality of sensors distributed throughout the communications network, calculating based on the performance data, an estimated lower limit of an available bandwidth in the communications network and an estimated upper limit of the available bandwidth in the communications network, receiving a query from a network attached entity for the available bandwidth in the communications network, and providing, in response to the query, the estimated lower limit and the estimated upper limit to the network attached entity.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides a system, method, and non-transitory computer readable medium for providing estimated bandwidth ranges to network-attached entities such as applications, user endpoint devices, and customer premises equipment. As discussed above, many modern network-connected applications, including video conferencing applications, extended reality (e.g., virtual reality, augmented reality, mixed reality, and the like) applications, immersive gaming applications, and the like, are bandwidth intensive. That is, these applications (and others like them) consume large amounts of the available bandwidth in a network. However, these applications typically do not have knowledge of the actual amount of network bandwidth that is available. As a result, these applications may end up either sending data that consumes more network bandwidth than what is actually available (which may result in stalls, buffering, or long loading times) or sending data that consumes less network bandwidth than what is actually available (which may result in poor data quality when better quality is possible).

Similar issues may be experienced by user endpoint devices and by the modern Transmission Control Protocol/Internet Protocol (TCP/IP) stack of systems (including user endpoint devices such as personal computers, smart phones, tablet computers, and the like). For instance, if the TCP/IP stack on a user endpoint device does not know how much traffic a network can support, the TCP/IP stack may begin sending data at an extremely low rate out of caution and back off aggressively when packet loss is detected.

Examples of the present disclosure optimize application bandwidth usage via a network that provides an estimate of a range of available bandwidth, bounded by a lower limit and an upper limit, to user endpoint devices. In one example, each of the lower limit and the upper limit is associated with a confidence score that indicates the network's confidence in the accuracy of the estimated value. Having access to the lower limit and the upper limit on the available bandwidth will help the user endpoint devices (and the applications running on the user endpoint devices) to fine-tune their bandwidth usage, and thereby optimizing the experience of the end users. These and other aspects of the present disclosure are discussed in further detail with reference to FIGS. 1-4, below.

Figure 1:
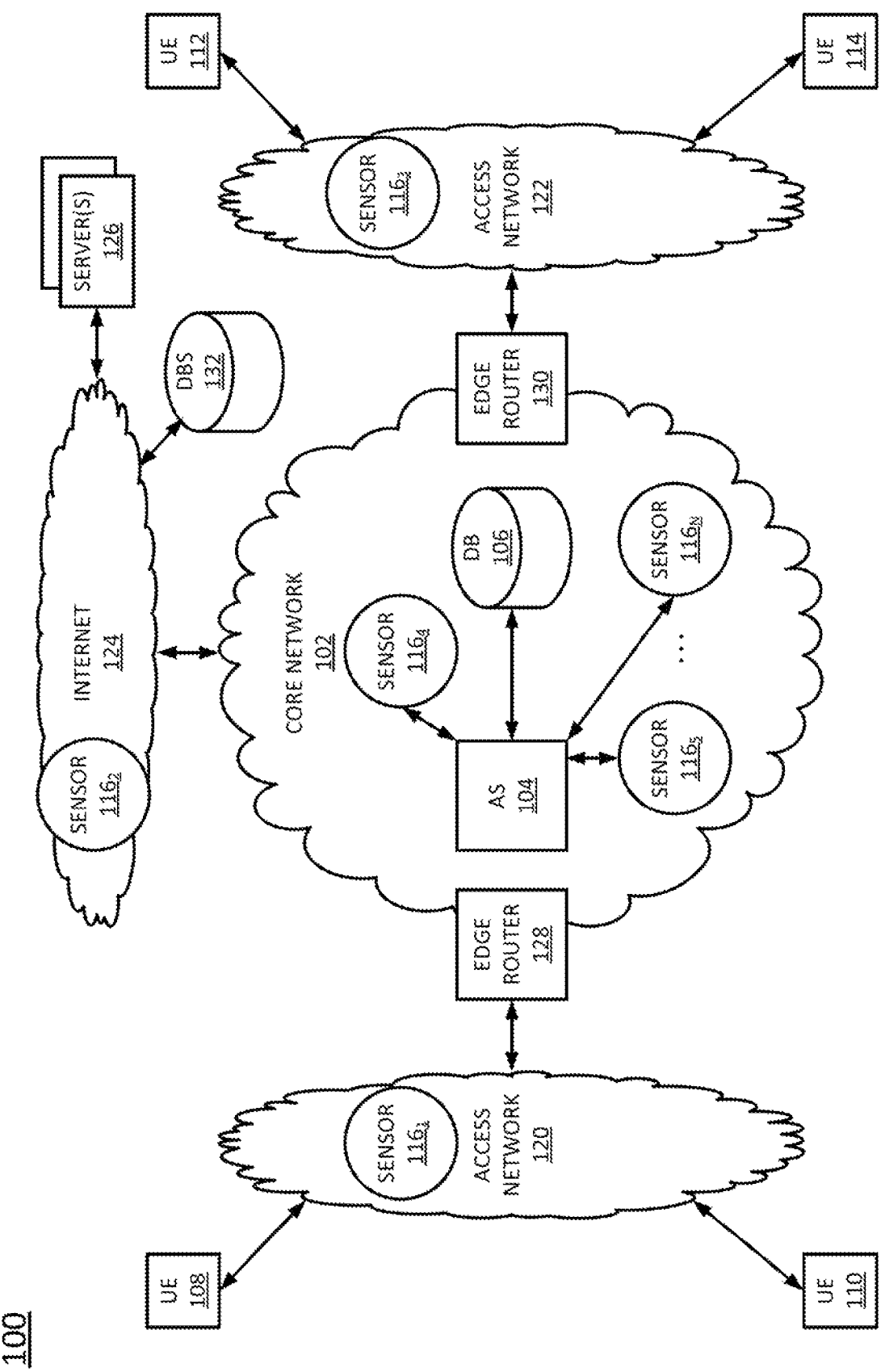
FIG. 1 illustrates an example system related to the present disclosure.

To further aid in understanding the present disclosure, FIG. 1 illustrates an example system 100 in which examples of the present disclosure for providing estimated bandwidth ranges to network-attached entities such as applications may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, at least one database (DB) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3 rd party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device, such as computing system 400 depicted in FIG. 4, and may be configured as described below. For example, the user endpoint devices 108, 110, 112, and 114 may each comprise a mobile device, a cellular smart phone, a gaming console, a set top box, a laptop computer, a tablet computer, a desktop computer, an application server, a wearable device (e.g., a smart watch or fitness tracker), an augmented reality (AR), virtual reality (VR) headset, customer premises equipment (e.g., gateway devices), a bank or cluster of such devices, and the like. In one example, any one of the user endpoint devices 108, 110, 112, and 114 may be operable to run an application that may communicate with the server(s) 126 or other application servers in the system 100, as discussed in greater detail below.

In one example, one or more servers 126 and one or more databases 132 may be accessible to user endpoint devices 108, 110, 112, and 114 via Internet 124 in general. The server(s) 126 and DBs 132 may be associated with Internet software applications that may exchange data with the user endpoint devices 108, 110, 112, and 114 over the Internet 124. Thus, some of the servers 126 and DBs 132 may host applications including video conferencing applications, extended reality (e.g., virtual reality, augmented reality, mixed reality, and the like) applications, immersive gaming applications, and the like.

Figure 4:
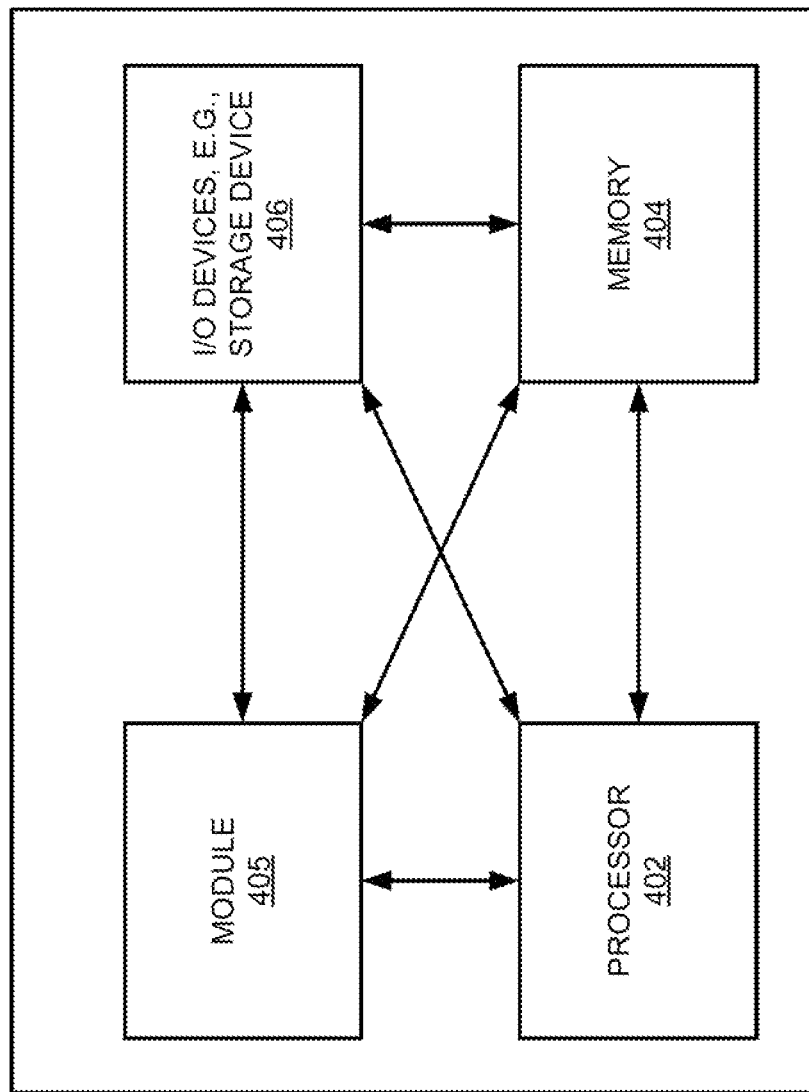
FIG. 4 depicts a high-level block diagram of a computing device specifically programmed to perform the functions described herein.

In accordance with the present disclosure, the AS 104 may be configured to provide one or more operations or functions in connection with examples of the present disclosure for providing estimated bandwidth ranges to network-attached entities such as applications (e.g., applications running on user endpoint device 108, 110, 112, and 114), user endpoint devices (e.g., user endpoint devices 108, 110, 112, and 114), and customer premises equipment, as described herein. The AS 104 may comprise one or more physical devices, e.g., one or more computing systems or servers, such as computing system 400 depicted in FIG. 4, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, the AS 104 may be configured to collect network performance data from a plurality of sensors 116₁-116N (hereinafter individually referred to as a "sensor 116" or collectively referred to as "sensors 116") distributed throughout the system 100. The sensors 116 may provide data from which the available bandwidth of the system 100 can be estimated. For instance, the sensors 116 may include routers, switches, and/or other network elements that implement protocols (such as simple network management protocol or SNMP) that can track bandwidth usage in the system 100. In another example, the sensors 116 may comprise dedicated sensors, where the dedicated sensors may implement similar protocols to track bandwidth usage (but may perform no other functions aside from bandwidth tracking).

The AS 104 may be further configured to calculate, based on the network performance data, an estimated lower limit of the available bandwidth of the system 100 and an estimated upper limit of the available bandwidth of the system 100, where the estimated lower limit and the estimated upper limit define a range of the estimated available bandwidth of the system 100 (the range being bounded by the estimated lower limit and the estimated upper limit and including all values in between and including the estimated lower limit and the estimated upper limit). The AS 104 may be further configured to calculate confidences associated with each of the estimated lower limit and the estimated upper limit, where the confidences represent likelihoods that the estimated limits are accurate. In one example, the AS 104 may perform the calculations using a machine learning model that takes as input the network performance data and outputs as predictions the estimated lower limit, the estimated upper limit, and (optionally) the confidences.

The AS 104 may provide the estimated lower limit, and estimated upper limit, and (optionally) the confidences to any of the user endpoint devices 108, 110, 112, or 114 or to any applications running on any of the user endpoint devices 108, 110, 112, or 114. In one example, the AS 104 may provide the estimated lower limit, and estimated upper limit, and (optionally) the confidences to any of the user endpoint devices 108, 110, 112, or 114 (or applications running thereon) directly, in response to a query. In another example, the AS 104 may publish the estimated lower limit, and estimated upper limit, and (optionally) the confidences to a telemetry source, and the IP address (or other identifiers) of the telemetry source may be provided to the user endpoint devices 108, 110, 112, and 114.

In one example, the DB 106 may store the estimated lower limit, and estimated upper limit, and (optionally) the confidences. In one example, the DB 106 may comprise a physical storage device integrated with the AS 104 (e.g., a database server or a file server), or attached or coupled to the AS 104, in accordance with the present disclosure. In one example, the AS 104 may load instructions into a memory, or one or more distributed memory units, and execute the instructions for providing estimated bandwidth ranges to network-attached entities such as applications, user endpoint devices, and customer premises equipment, as described herein. One example method for providing estimated bandwidth ranges to network-attached entities such as applications, user endpoint devices, and customer premises equipment is described in greater detail below in connection with FIG. 2.

In one example, any of the user endpoint devices 108, 110, 112, or 114 (or any applications running thereon), having obtained the estimated lower limit, and estimated upper limit, and (optionally) the confidences, may utilize the estimated lower limit, and estimated upper limit, and (optionally) the confidences in order to modify settings of the user endpoint devices 108, 110, 112, or 114 (or applications running thereon). The settings that are modified may relate to data transfers between the user endpoint devices 108, 110, 112, or 114 (or applications running thereon) and a remote application server (e.g., one of the server(s) 126). For instance, the modification to the settings may change a rate at which data is transferred between the remote application server and the endpoint devices 108, 110, 112, or 114 (or applications running thereon), a codec used to encode the data being transferred, or the like. In this way, the data transfer may be optimized in a manner that provides a good user experience.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

Figure 2:
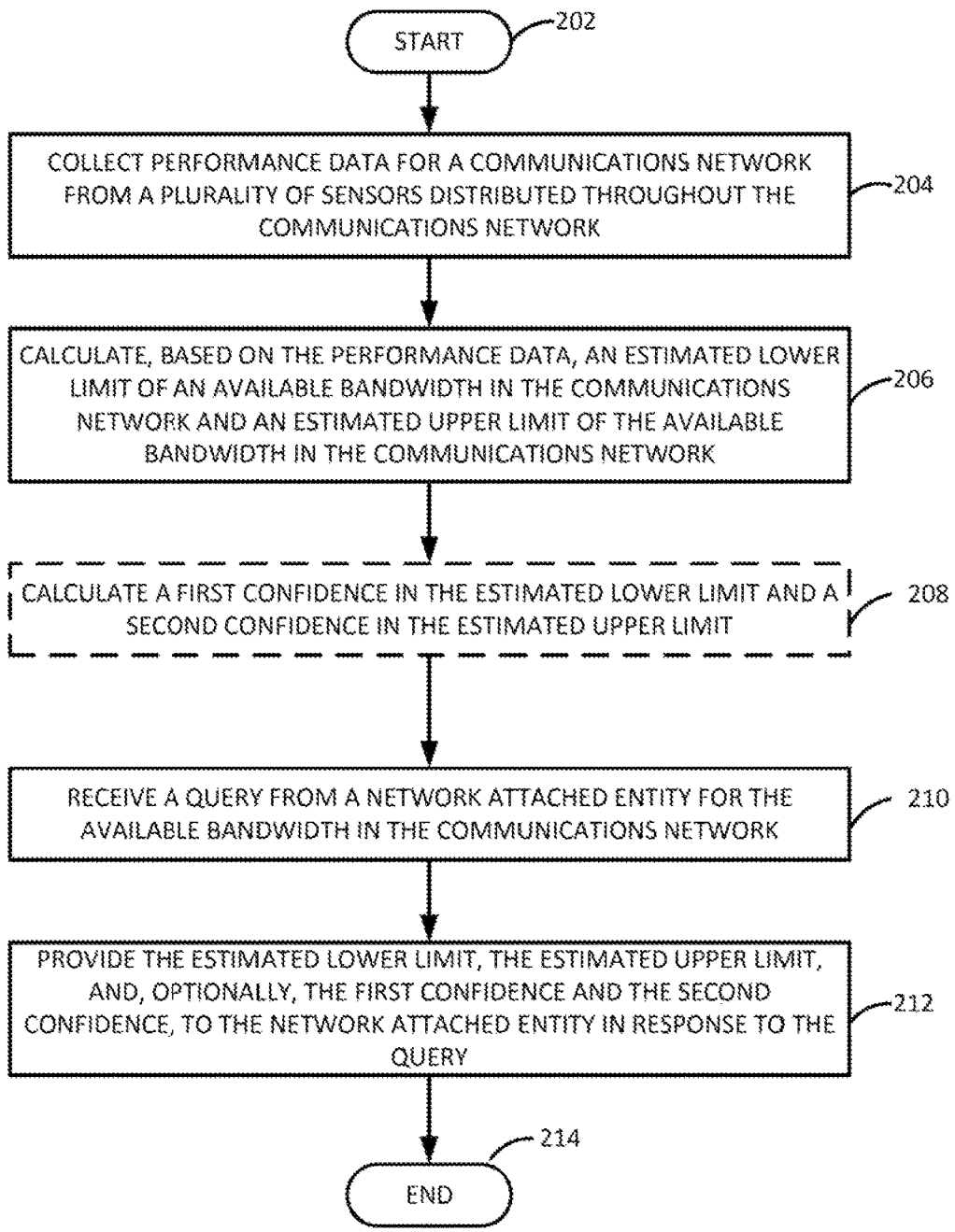
FIG. 2 illustrates a flowchart of an example method for providing estimated bandwidth ranges to network-attached entities.

To further aid in understanding the present disclosure, FIG. 2 illustrates a flowchart of an example method 200 for providing estimated bandwidth ranges to network-attached entities. In one example, the method 200 may be performed by the application server 104 illustrated in FIG. 1. However, in other examples, the method 200 may be performed by another device, such as the computing system 400 of FIG. 4, discussed in further detail below. For the sake of discussion, the method 200 is described below as being performed by a processing system (where the processing system may comprise a component of the application server 104, the computing system 400, or another device).

The method 200 begins in step 202. In step 204, the processing system may collect performance data for a communications network from a plurality of sensors distributed throughout the communications network.

In one example, the communications network may be a software defined network. The software defined network may be a terrestrial network or a mobile network (e.g., a 5G network). In one example the bandwidth of the communications network is variable, and the communications network may be instrumented to provide a best estimate as to a range of the available bandwidth at any given time, as discussed in further detail below.

As discussed above, the communications network may be instrumented with a plurality of sensors distributed throughout the communications network, where the sensors may provide data from which the available bandwidth of the communications network can be estimated. For instance, sensors may include routers, switches, and/or other network elements that implement protocols (such as simple network management protocol or SNMP) that can track bandwidth usage in the communications network. In another example, dedicated sensors (e.g., RAN sensors) may also be deployed within the communications network, where the dedicated sensors may implement similar protocols to track bandwidth usage (but may perform no other functions aside from bandwidth tracking).

In one example, the sensors may be configured to collect performance data including data that indicates errors, data that indicates loads on the communications network and/or the communications network's elements, data about connection statuses of user endpoint devices, performance statistics derived from statistical analysis based on packet data, and/or any other data that may be useful for predicting available bandwidth and the rate at which a user, a device, or an application should send data.

In step 206, the processing system may calculate, based on the performance data, an estimated lower limit of an available bandwidth in the communications network and an estimated upper limit of the available bandwidth in the communications network.

In one example, the estimated lower limit represents an estimate of a "floor" or minimum amount of bandwidth that can be guaranteed to a network attached entity that is connected to the communications network. Similarly, the estimated upper limit may represent an estimate of a "ceiling" or maximum amount of bandwidth that can be guaranteed to a network attached entity that is connected to the communications network. Thus, by calculating an estimated lower limit and an estimated upper limit, the processing system may inherently calculate an estimated range of the available bandwidth, where the range is bounded by, and includes all values in between, the estimated lower limit and the estimated upper limit. In one example, both the estimated lower limit and the estimated upper limit may be expressed in megabits per second (Mbps).

In one example, the estimated lower limit and the estimated upper limit may be calculated using one or more machine learning models. For instance, a machine learning model may be trained to take as input a set of performance data for a communications network and to generate, as an output, a prediction as to the estimated lower limit and the estimated upper limit of the available bandwidth in the communications network. In one example, the machine learning model may be, but is not limited to, a regression model, such as a linear regression model, a best-fit model, a least squats model, a gradient descent model, a simply linear regression model, a multiple linear regression model, a multivariate linear regression model, a polynomial regression model, a regularization model, a ridge and lasso regression model, or the like. In another example, the machine learning model may be, but is not limited to, a support vector machine, a supervised learning technique based on time-series performance information, a reinforcement learning-based model, or a combination of machine learning methods using the plurality of information sources (e.g., statistics based on packet data, data from the RAN such as data about errors, load, connections of user endpoint devices, and the like).

In optional step 208 (illustrated in phantom), the processing system may calculate a first confidence in the estimated lower limit and a second confidence in the estimated upper limit. In one example, the estimated lower limit and the estimated upper limit are estimates, rather than guarantees, of the minimum and maximum available bandwidth. Thus, the processing system may calculate confidences associated with each of the estimated lower limit and the estimated upper limit. The first confidence may indicate a likelihood that the estimated lower limit is accurate, while the second confidence may indicate a likelihood that the estimated upper limit is accurate. Thus, in one example, each confidence may comprise a number between zero and one (where zero indicates a lowest confidence and one indicates a highest confidence).

In one example, the first confidence and the second confidence may be generated using a machine learning model, such as the same machine learning model that is used to calculate the estimated lower limit and the estimated upper limit. For instance, the machine learning model may be trained to output a confidence value that is associated with each prediction of an estimated lower or upper limit on the available bandwidth.

In step 210, the processing system may receive a query from a network attached entity for the available bandwidth in the communications network. In one example, the network attached entity may comprise a user endpoint device (e.g., a personal computer, a tablet computer, a smart phone, a virtual reality headset, a wearable device, or the like), a specific application running on a user endpoint device (e.g., a streaming media application, a virtual reality gaming application, a video conferencing application, or the like), or an item of customer premises equipment (e.g., a home gateway or the like).

In one example, the query may be one query in a series of periodic queries from the network attached entity. For instance, the network attached entity may query the processing system every x minutes for the available bandwidth. In another example, the query may comprise a subscription to bandwidth updates from the processing system. In this case, when the network attached entity subscribes to updates from the processing system, the network attached entity may effectively be preemptively requesting updates from the processing system (e.g., periodic updates such as every x minutes, updates every time the estimated lower limit or the estimated upper limit changes by a threshold amount, etc.). In another example, the query may be a one-time query that is prompted by some event, such as a user endpoint device moving from one network to another network, an application being launched, or the like.

In step 212, the processing system may provide the lower limit, the upper limit (and, optionally, the first confidence and the second confidence, if calculated) to the network attached entity in response to the query. As discussed in further detail below in connection with FIG. 3, the network attached entity may use the lower limit, the upper limit, the first confidence, and/or the second confidence to select settings for a data transfer in order to optimize a user experience with respect to the data transfer (e.g., to stream higher quality video for a video conferencing application, to prevent stalls or buffering for a virtual reality gaming application, etc.).

In another example, the processing system may instead provide the IP address (or other identifiers) of a telemetry source from which the network attached entity may obtain lower limit, the upper limit (and, optionally, the first confidence and the second confidence, if calculated). For instance, the processing system may publish the lower limit, the upper limit (and, optionally, the first confidence and the second confidence, if calculated) to a telemetry source that can be directly queried by network attached entities.

The method 200 may end in step 214.

However, it will be appreciated that the method 200, or steps of the method 200, may be repeated over time. For instance, as discussed above, the available bandwidth in the communications network may vary over time, and, as such, the estimated lower limit and the estimated upper limit may change over time. The confidences associated with the estimated upper limit and the estimated lower limit may also change over time. Thus, in one example, one or more of steps 204-212 may be repeated periodically, according to a predefined schedule, on-demand (e.g., in response to a request from a network attached entity), or the like.

Figure 3:
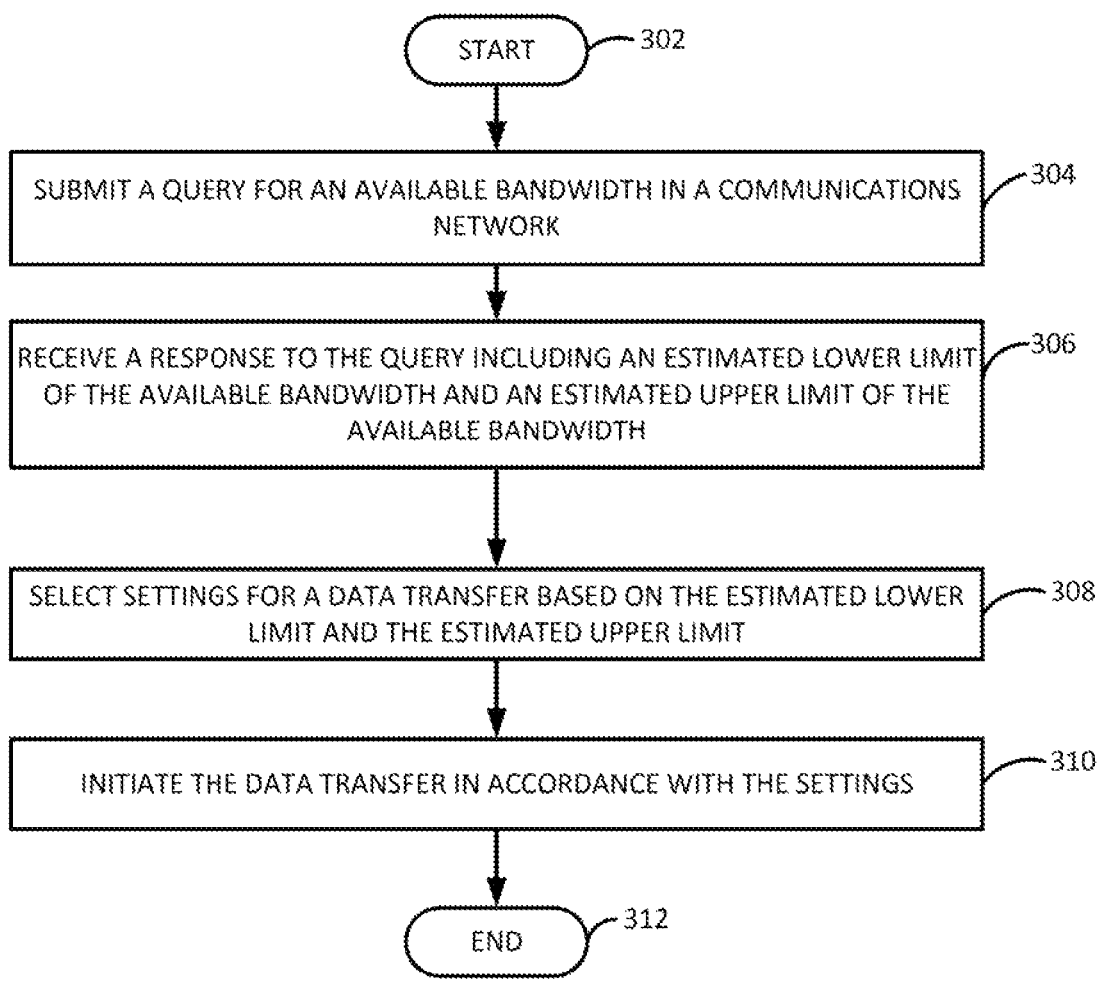
FIG. 3 illustrates a flowchart of an example method for providing estimated bandwidth ranges to network-attached entities.

FIG. 3 illustrates a flowchart of an example method 300 for providing estimated bandwidth ranges to network-attached entities. In one example, the method 300 may be performed by a network attached entity, such as one of the user endpoint devices 108, 110, 112, and 114 illustrated in FIG. 1. However, in other examples, the method 300 may be performed by another device, such as the computing system 400 of FIG. 4, discussed in further detail below. For the sake of discussion, the method 300 is described below as being performed by a processing system (where the processing system may comprise a component of a beacon, the computing system 400, or another device).

The method 300 begins in step 302. In step 304, the processing system may submit a query for an available bandwidth in a communications network.

In one example, the processing system may be part of a network attached entity, such as a user endpoint device (e.g., a personal computer, a tablet computer, a smart phone, a virtual reality headset, a wearable device, or the like) or an item of customer premises equipment (e.g., a home gateway or the like). In a further example, the processing system may submit the query on behalf of an application (e.g., a streaming media application, a virtual reality gaming application, a video conferencing application, or the like) running on a user endpoint device or an item of customer premises equipment.

In one example, the query may be sent to a telemetry source whose IP address has been provided to the processing system. For instance, upon connecting to a communication point in the communications network (such as a cellular base station or gNodeB), the processing system may be provided with the IP address of a telemetry source to query when the processing system needs to know the available bandwidth for the communications network. The IP address of the telemetry source may be provided to the processing system via standard methods available in TCP/IP networking, such as via dynamic host configuration protocol (DHCP).

In one example, the query may specify a desired threshold confidence in the estimated bandwidth that is provided in response to the query. For instance, the query may request that any estimated lower limit and/or estimated upper limit on the available bandwidth that has a confidence of at least y be provided. As discussed above, the communication network's estimates as to the lower and upper limits of available bandwidth may be associated with confidences in the accuracies of those estimates. Some estimates may be associated with higher confidences than others.

In step 306, the processing system may receive a response to the query including an estimated lower limit of the available bandwidth and an estimated upper limit of the available bandwidth. The estimated lower limit and the estimated upper limit effectively define a range in which the actual available bandwidth likely falls, where the range is bounded by the lower limit and the upper limit and includes all values therebetween.

As discussed above, each of the estimated lower limit and the estimated upper limit may be associated with a confidence, which may also be specified in the response to the query. The confidence may be a number between zero and one (with zero representing a lowest confidence and one representing a highest confidence) that represents a likelihood that the associated estimated bandwidth limit (e.g., lower or upper) is accurate.

In step 308, the processing system may select settings for a data transfer based on the estimated lower limit and the estimated upper limit. For instance, as discussed above, knowledge of the estimated lower limit and the estimated upper limit may help the processing system to optimize a user experience with respect to the data transfer (e.g., to stream higher quality video for a video conferencing application, to prevent stalls or buffering for a virtual reality gaming application, etc.). Optimization may involve adjusting a sending rate for sending and receiving data, selecting a particular codec for encoding and decoding data, or the like.

In step 310, the processing system may initiate the data transfer in accordance with the settings. For instance, based on the settings, the processing system may request video encoded at a particular bitrate from an application server that streams video, or may adjust the refresh rate of an image generated by an AR/VR gaming application running on an AR/VR headset.

In step 312, the method 300 may end.

Although not expressly specified above, one or more steps of the method 200, or 300 may include a storing, displaying, and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 or 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

Thus, examples of the present disclosure effectively provide a network attached entity with a range describing the available bandwidth for a communications network, rather than a single bandwidth value. This range may help the network attached entity to more effectively optimize bandwidth-intensive applications and improve user experience. Thus, examples of the present disclosure split the task of bandwidth optimization between the network, which supplies intelligent telemetry regarding the range of available bandwidth, and the network attached entity, which uses the intelligent telemetry to fine tune parameters like sending rate, flow control, and the like.

Examples of the present disclosure work with modern client-side applications and TCP/IP stacks, which are typically already configured to vary bandwidth usage between a floor and a ceiling as network conditions change (but which typically have no view into what that floor and ceiling should be). Moreover, the provision of the confidences can enable critical applications to ask for available bandwidth estimates with higher confidences (which would likely yield more conservative estimates of available bandwidth but also facilitate a more consistent experience on the user side).

As an example use case, a user of an augmented reality (AR) or virtual reality (VR) headset may be moving among networks while using the headset. For instance, the headset may initially connect to a first cellular base station (e.g., gNodeB) having an estimated lower limit of thirty Mbps (with a confidence of 0.95) and an estimated upper limit of forty Mbps (with a confidence of 0.95). The headset may have received the information about the estimated lower limit, the estimated upper limit, and the confidences by polling the IP address of a first telemetry source that is provided as a DHCP option and by asking for lower and/or upper limits having confidences of at least 0.95. An AR/VR application running on the headset may be actively in use by the user and may be consuming thirty-seven Mbps (e.g., between thirty and forty-five Mbps). As the user moves through various real world geographic locations, the headset may connect to a second cellular base station and receive an IP address of a second, different telemetry source (i.e., different from the first telemetry source). Upon receiving the IP address of the second telemetry source, the headset may recognize that it has connected to a new cellular base station, and may poll the second telemetry source (again, potentially requesting estimated lower and upper limits having confidences of at least 0.95). The second telemetry source may indicate that the estimated lower limit is now sixty Mbps (with a confidence of 0.95) and the estimated upper limit is now eighty Mbps (with a confidence of 0.95). Thus, the headset may immediately increase its sending rate from thirty-seven Mbps to seventy Mbps.

FIG. 4 depicts a high-level block diagram of a computing device specifically programmed to perform the functions described herein. For example, any one or more components or devices illustrated in FIG. 1 or described in connection with the methods 200 and 300 may be implemented as the system 400. For instance, the application server 104 of FIG. 1 (such as might be used to perform the method 200) could be implemented as illustrated in FIG. 4. In another example, one of the user endpoint devices 108, 110, 112, or 114 of FIG. 1 (such as might be used to perform the method 300) could be implemented as illustrated in FIG. 4.

As depicted in FIG. 4, the system 400 comprises a hardware processor element 402, a memory 404, a module 405 for providing estimated bandwidth ranges to network-attached entities, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for providing estimated bandwidth ranges to network-attached entities may include circuitry and/or logic for performing special purpose functions relating to estimating available bandwidth ranges and/or modifying settings for data transfers according to available bandwidth ranges. The input/output devices 406 may include, for example, storage devices (including but not limited to, a tape drive, a floppy drive, a hard disk drive or a compact disk drive), a receiver, a transmitter, a fiber optic communications line, an output port, or a user input device (such as a keyboard, a keypad, a mouse, and the like).

Although only one processor element is shown, it should be noted that the general-purpose computer may employ a plurality of processor elements. Furthermore, although only one specific-purpose computer is shown in the Figure, if the method(s) as discussed above is implemented in a distributed or parallel manner for a particular illustrative example, i.e., the steps of the above method(s) or the entire method(s) are implemented across multiple or parallel specific-purpose computers, then the specific-purpose computer of this Figure is intended to represent each of those multiple specific-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for providing estimated bandwidth ranges to network-attached entities (e.g., a software program comprising computer-executable instructions) can be loaded into memory 404 and executed by hardware processor element 402 to implement the steps, functions or operations as discussed above in connection with the example methods 200, and 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for providing estimated bandwidth ranges to network-attached entities (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
collecting, by a processing system including at least one processor, performance data for a communications network from a plurality of sensors distributed throughout the communications network;
calculating, by the processing system, based on the performance data, an estimated value of a lower limit of an available bandwidth in the communications network and an estimated value of an upper limit of the available bandwidth in the communications network;
receiving, by the processing system, a query from a network attached entity that is separate from the processing system for the available bandwidth in the communications network, the available bandwidth having a bandwidth range; and
providing, by the processing system, a response to the query to the network attached entity via an access network of the communications network, wherein the response contains the estimated value of the lower limit and the estimated value of the upper limit to allow the network attached entity to select, based on the estimated value of the lower limit and the estimated value of the upper limit, an optimal bandwidth usage setting for a data transfer.

2. The method of claim 1, wherein the communications network is a software defined network.

3. The method of claim 2, wherein the software defined network is a fifth generation mobile network.

4. The method of claim 1, wherein the communications network is instrumented with the plurality of sensors distributed throughout the communications network, and wherein the plurality of sensors provides the performance data to the processing system.

5. The method of claim 1, wherein the estimated value of the lower limit represents an estimate of a minimum amount of bandwidth that can be guaranteed to the network attached entity that is connected to the communications network.

6. The method of claim 1, wherein the estimated value of the upper limit represents an estimate of a maximum amount of bandwidth that can be guaranteed to the network attached entity that is connected to the communications network.

7. The method of claim 1, wherein the estimated value of the lower limit and the estimated value of the upper limit define an estimated range of the bandwidth range of the available bandwidth, where the estimated range is bounded by, and includes all values in between, the estimated value of the lower limit and the estimated value of the upper limit.

8. The method of claim 1, wherein the calculating is performed using a machine learning model that generates the estimated value of the lower limit and the estimated value of the upper limit as outputs.

9. The method of claim 8, wherein the machine learning model comprises at least one of: a regression model, a best-fit model, a least squats model, a gradient descent model, a simply linear regression model, a multiple linear regression model, a multivariate linear regression model, a polynomial regression model, a regularization model, or a ridge and lasso regression model.

10. The method of claim 1, wherein the network attached entity comprises at least one of: a user endpoint device, a specific application running on a user endpoint device, or an item of customer premises equipment.

11. The method of claim 1, wherein the query comprises a subscription to bandwidth updates from the processing system.

12. The method of claim 1, wherein the query comprises a one-time query that is prompted by an occurrence of a predefined event.

13. The method of claim 1, further comprising:
calculating, by the processing system, a first confidence in the estimated value of the lower limit and a second confidence in the estimated value of the upper limit; and
providing, by the processing system, the first confidence and the second confidence in response to the query.

14. The method of claim 13, wherein the first confidence and the second confidence are output by a machine learning model that also outputs the estimated value of the lower limit and the estimated value of the upper limit.

15. The method of claim 1, wherein the query specifies a minimum requested confidence in the estimated value of the lower limit and a minimum requested confidence in the estimated value of the upper limit.

16. The method of claim 15, wherein a confidence associated with the estimated value of the lower limit is at least as high as the minimum requested confidence in the estimated value of the lower limit, and wherein a confidence associated with the estimated value of the upper limit is at least as high as the minimum requested confidence in the estimated value of the upper limit.

17. The method of claim 1, wherein the estimated value of the lower limit and the estimated value of the upper limit are used to modify at least one setting of the network attached entity that relates to the data transfer.

18. The method of claim 17, wherein the at least one setting affects at least one of: a rate of the data transfer or a codec used by the data transfer.

19. A non-transitory computer-readable medium storing instructions which, when executed by a processing system including at least one processor, cause the processing system to perform operations, the operations comprising:
collecting performance data for a communications network from a plurality of sensors distributed throughout the communications network;
calculating based on the performance data, an estimated value of a lower limit of an available bandwidth in the communications network and an estimated value of an upper limit of the available bandwidth in the communications network;
receiving a query from a network attached entity that is separate from the processing system for the available bandwidth in the communications network, the available bandwidth having a bandwidth range; and
providing a response to the query to the network attached entity via an access network of the communications network, wherein the response contains the estimated value of the lower limit and the estimated value of the upper limit to allow the network attached entity to select, based on the estimated value of the lower limit and the estimated value of the upper limit, an optimal bandwidth usage setting for a data transfer.

20. A system comprising:
a processing system including at least one processor; and
a non-transitory computer-readable medium storing instructions which, when executed by the processing system, cause the processing system to perform operations, the operations comprising:
collecting performance data for a communications network from a plurality of sensors distributed throughout the communications network;
calculating based on the performance data, an estimated value of a lower limit of an available bandwidth in the communications network and an estimated value of an upper limit of the available bandwidth in the communications network;

receiving a query from a network attached entity that is separate from the processing system for the available bandwidth in the communications network, the available bandwidth having a bandwidth range; and providing a response to the query to the network attached entity via an access network of the communications network, wherein the response contains the estimated value of the lower limit and the estimated value of the upper limit to allow the network attached entity to select, based on the estimated value of the lower limit and the estimated value of the upper limit, an optimal bandwidth usage setting for a data transfer.

* * * * *